US012614299B2

(12) United States Patent
Sanchez Kaiser

(10) Patent No.: US 12,614,299 B2
(45) Date of Patent: Apr. 28, 2026

(54) SYSTEM, DEVICE, AND METHOD FOR IMPROVING VISUAL AND/OR AUDITORY TRACKING OF A PRESENTATION GIVEN BY A PRESENTER

(71) Applicant: BEMYVEGA, SL, Espinardo (ES)

(72) Inventor: Antonio Sanchez Kaiser, Espinardo (ES)

(73) Assignee: BEMYVEGA, SL, Espinardo (ES)

( * ) Notice: Subject to any disclaimer, the term of this patent is extended or adjusted under 35 U.S.C. 154(b) by 354 days.

(21) Appl. No.: 17/999,111

(22) PCT Filed: May 12, 2021

(86) PCT No.: PCT/ES2021/070337
§ 371 (c)(1),
(2) Date: Nov. 17, 2022

(87) PCT Pub. No.: WO2021/234199
PCT Pub. Date: Nov. 25, 2021

(65) Prior Publication Data
US 2023/0196603 A1     Jun. 22, 2023

(30) Foreign Application Priority Data

May 17, 2020    (ES) ............................ ES202030945U

(51) Int. Cl.
*G06T 7/292*         (2017.01)
*G06T 7/70*          (2017.01)
(Continued)

(52) U.S. Cl.
CPC .................. *G06T 7/70* (2017.01); *G09B 5/06* (2013.01); *G10L 15/26* (2013.01); *H04L 67/025* (2013.01);
(Continued)

(58) Field of Classification Search
USPC ............ 382/103–159; 704/1–275; 706/1–62, 706/900–903, 908–909, 927;
(Continued)

(56) References Cited

U.S. PATENT DOCUMENTS 7,689,898 B2 *   3/2010   Merril ..................... G06F 16/40
                                                           715/201
8,831,505 B1     9/2014   Seshadri
(Continued)

FOREIGN PATENT DOCUMENTS

WO          2012088443 A1      6/2012

OTHER PUBLICATIONS

Kushalnagar Raja S. et al.; Single-Screen Focus for Deaf and Hard of Hearing Students; 2016 (Year: 2016).*
(Continued)

*Primary Examiner* — Marcellus J Augustin
(74) *Attorney, Agent, or Firm* — LUCAS & MERCANTI, LLP

(57)          ABSTRACT

A system, device, and method to improve visual and/or auditory tracking of a presentation given by a presenter, the system having a first electronic device integrating a first piece of software for obtaining information run in the device; a second electronic device integrating a second piece of software; a microphone for obtaining auditory information of the presentation; a compact module comprising a single-board computer, a router, a power supply, a fixed camera for acquiring information of the presentation shown in a support, and a moving camera for acquiring information of the presenter's position; tracking device for obtaining presenter tracking information based on the information of the position. The second piece of software is adapted for showing the information run in the first electronic device, the auditory information of the presentation, the information (Continued)

shown through the support, and the presenter tracking information.

19 Claims, 3 Drawing Sheets

(51) Int. Cl.
  *G09B 5/06*          (2006.01)
  *G10L 15/26*         (2006.01)
  *H04L 67/025*        (2022.01)
(52) U.S. Cl.
  CPC ............... *G06T 2207/10048* (2013.01); *G06T 2207/30196* (2013.01)
(58) Field of Classification Search
  USPC .................. 715/200–204, 254–256, 727–757
  See application file for complete search history.

(56)                    References Cited

U.S. PATENT DOCUMENTS 11,113,983  B1 *   9/2021  Fieldman ............... G09B 5/065
2004/0002049  A1    1/2004  Beavers et al.
2008/0209330  A1 *   8/2008  Cruver ............... H04L 12/1831
                                                 715/733
2016/0360096  A1 *  12/2016  Holmes ............... F16M 11/205
2021/0056251  A1 *   2/2021  Parmar ............... G06F 3/04847

OTHER PUBLICATIONS

Kim, Young Dae; Method for Smart-Remote Lecturing Using Automatic Scene-Transition Technology Having Artificial Intelligence Function in Virtual and Augmented Reality Lecture Room; 2020 (Year: 2020).*
Raja S. Kushalnagar, et al., "Singlescreenfocus for Deaf and Hard of Hearing Students", ICIAP: International Conference on Image Analysis and Processing, pp. 433-437, 2016.
"Aver PCT500S", pp. 1-4, 2019, XP055834090.
"Rompiendo barreras para acceder al conocimiento, Fundacion Seneca", pp. 1-2, 2021, XP055834610 and English Translation.
Sanchez Kaiser Antonio, "Bemyvega en III Congreso Retina Murcia", (1 page), 2020, XP055834611.
International Search Report and Written Opinion for Corresponding International Application No. PCT/ES2021/070337 (12 Pages) (Sep. 3, 2021).

* cited by examiner

SYSTEM, DEVICE, AND METHOD FOR IMPROVING VISUAL AND/OR AUDITORY TRACKING OF A PRESENTATION GIVEN BY A PRESENTER

CROSS REFERENCE TO RELATED APPLICATION

This Application is a 371 of PCT/ES2021/070337 filed on May 12, 2021, which claims priority of Spanish Patent Application No. U202030945 filed May 17, 2020, both of which are incorporated herein by reference.

TECHNICAL FIELD

The present invention relates generally to systems and methods for the improvement of capturing and providing multimedia information. More specifically, the present invention provides a system, device, and method to improve visual and/or auditory tracking of a presentation given by a presenter. The invention allows an improved tracking of the presentation, particularly for people with certain visual and/or auditory impairment.

For the sake of clarity and simplicity, in this text, the term presentation will be used to cover any type of educational and/or informative activity such as presentations, classes, conferences, congresses, events, seminars, court hearings, or any other activity. Likewise for the sake of simplicity, the term presenter will be used to refer to the person performing said activity.

BACKGROUND OF THE INVENTION

Today, a large part of educational contents are imparted through talks, presentations, congresses, etc., that are increasing in number and becoming more and more appealing for users to obtain the information they desire about a specific field. Together with conventional classes and classroom activities, they form an increasingly sought after field of education that, however, has a significant drawback to be overcome, which is the ability to allow the correct tracking of said activities in a manner that is as universal as possible, i.e., covering the largest possible number of people and personal circumstances. Solving these problems and overcoming the existing difficulty is a need and an obligation of today's society so that everyone can access this information on equal terms.

From the point of view of a student or listener who attends a class or presentation, the student or listener will sometimes have to look at the presenter in order to hear him or her and to perceive, through his or her body language, the things that are important, listen to his or her speech, and how he or she transmits the information. At other times, the student or listener has to look at the blackboard given that the presenter may be using it as a support for a demonstration or commentary, or he or she may also have to look at the projected image of a presentation, a video, or any other information the presenter wants to show through his or her computer and the classroom projector. This combination of information is what any person needs to access in order to correctly follow a class.

The existing devices do not allow the joint recovery of all this information required to fully follow the class or presentation. The main drawbacks of these devices relate to aspects such as difficulties in emitting all these signals at the same time (the image of the blackboard, the image of the presentation, the image of the presenter with tracking, and the speech of the presenter) in real time (with a very low latency, for example, of less than 0.5 second). Furthermore, they are faced with the impossibility of specifically tracking the presenter or professor in situations where several people are present, where they are not capable of dealing with scenarios in which the professor faces the blackboard with his or her back to the audience, writes on the blackboard, and moves simultaneously (a rather common situation).

Another problem is that, given that the existing devices do not perform a correct tracking, they require very wide shots of the scene to enable capturing the entire blackboard (which sometimes measures several meters), where they are thereby limited by the impossibility of zooming in on any of the parts (for example, to have an enlarged view of any text written on the blackboard) as the image does not have the quality necessary to see the small details.

In many cases, they need a signal production and processing center which provides all the information required in the conditions suitable for obtaining the information about the class. Often, they must also be installed in a room by specialized personnel as they are not portable devices.

They are not inclusive systems because some are equipment of a considerable size used only by the person with the disability, whereas others can only be controlled by one person, again emphasizing his or her disability.

In recent years, various studies have analyzed the accessibility of virtual and technological environments in Spanish universities. It was concluded from the analysis of said studies that, despite the approved law, accessibility to the information provided both in the actual conventional environments (where a professor gives a class on a blackboard in a conventional manner), as well as in the virtual and technological environments (such as digital platforms or material in electronic format), of the group of Spanish universities is considered insufficient, and the technical aid to access said environments for the visually impaired is extremely limited.

If other educational environments (primary, secondary, and vocational education) where the adaptation needs are the same are analyzed, the situation is very similar. Classrooms have very limited means to allow the visually and hearing impaired to be able to really access the knowledge and information in the same conditions as those without this impairment.

Although there are different devices today which can be used in the educational environment for the purpose of providing access to and following the content of any type of educational activity being imparted, they all have several drawbacks.

One of the systems existing on the market is Ablecenter AC-03, a system intended only for the visually impaired which consists of a high-quality 360° camera that is placed on the ceiling of the room and can be operated by an operator or client to enable manually focusing on any point of the room, for example, the blackboard or the image projected by the projector. The system can be controlled through smart electronic devices under the Android™, Windows™, or IOS™ platforms, has an OCR text recognition system incorporated therein, and considerable capabilities for zooming in on any point of the room. However, this system has significant drawbacks. First, it is only intended for the visually impaired, does not emit any audio signal of the presenter's narration, nor does it have speech recognition, so it cannot be used by the hearing impaired. Second, although it can be aimed at any point of the room, this must be done manually, so it does not seem to be suitable for tracking a presenter who is free to move about and for being able to recognize the presenter's body language. Third, it must be specifically installed by specialized technical staff on the ceiling of the room where it will be used, not exhibiting any portability possibility. Fourth, the camera can only be controlled by one user, so it is impossible for several people in a room to choose which image inside the room to focus on.

Another existing system is the Magnilink Student Addition, the operation of which is similar to Ablecenter with the only modification being the camera not being located on the ceiling or controlled by means of the PC, but rather on the desk of the visually impaired student and controlled by the user directly handling it, aiming it at the place to be focused on by hand. This system has the same drawbacks as the system described above.

Likewise, there are also cameras with tracking possibility, such as the Lumens VC-TR1 model or AVer PTC500S model which allow tracking the presenter in controlled environments, which tracking is, however, difficult to perform in complex environments with many people interacting with one another. These pieces of equipment do not allow capturing the complete experience given that they only collect partial information, and therefore do not cover the needs reflected above, while at the same time presenting difficulties to perform tracking in complex environments with many people interacting with one another.

There are also some patent documents which describe systems of this type. For example, documents U.S. Pat. No. 8,831,505B1, WO2012088443A1, and US2004002049A1 describing systems for recording and broadcasting an educational talk or presentation with one or more cameras and microphones for capturing visual/auditory information, information which is transmitted, by means of a local network of the room, to a control and production server. The first document makes it easier to track the presenter by means of a portable device integrating a wireless microphone and an infrared emitter, the rest do not indicate any specific tracking system. These systems have several significant drawbacks such as the need for a control and production server to record, edit, and combine the audio and image signals together with those coming from the presenter's computer, the inability to achieve a sufficiently low latency in the provision of the capture information, and either they are lacking a presenter tracking system or it is based solely on infrared, with the subsequent problems that it entails (described above) in achieving reliable tracking at all times in environments with variable light conditions in the presence of several people. They also do not include accessibility tools integrated in the system which allow converting same into a universal accessibility system.

There is therefore a need for new systems, devices, and methods which allow a correct in situ (in the classroom or place of presentation) tracking of the presenter in real time, as well as the transmission of all the information (both what the presenter says and does, as well as what he or she shows on the blackboard, a projection screen, or on his or her computer with a very low latency, so as to improve the access provided to the educational activity).

DESCRIPTION OF THE INVENTION

An object of the present invention is to provide a system, device, and method which allows following the content of any educational activity (or more generally speaking, any informative activity such as presentations, classes, conferences, congresses, events, seminars, or any other) in a manner that is as complete, precise, accessible, and universal as possible.

Claims 1, 13, and 15 describe the present invention. The preferred embodiments are described in claims 2-12, 14, and 16-19.

To solve the limitations of the state of the art, the present invention provides, according to a first aspect, a system to improve visual and/or auditory tracking of a presentation given by a presenter. The system comprises: a first electronic device of the presenter integrating a first piece of software configured for obtaining at least information run in the first electronic device; at least a second electronic device of the user, integrating a second piece of software; a microphone adapted for obtaining auditory information of the presentation; a compact module comprising a fixed camera, a moving camera, a single-board computer, a router, and a power supply, wherein the fixed camera is configured for acquiring information of the presentation shown through an information display support, for example a blackboard, flip chart, or any other means where the presenter can show information; the moving camera is configured for continuously acquiring information of the presenter's position; the single-board computer, the fixed camera, and the moving camera are operatively connected to the router; and the router provides a local communication network between the first electronic device and the second electronic device. Likewise, the system includes presenter tracking means (i.e., to know his or her location localization at all times) configured for obtaining presenter tracking information at least based on the information of the presenter's position acquired by the moving camera. The second piece of software is adapted for showing through the second electronic device: the information run in the first electronic device, the auditory information of the presentation, the information shown through the information display support, and the presenter tracking information.

In one embodiment, the presenter tracking means comprise an artificial intelligence algorithm including reinforcement learning algorithms and supervised and unsupervised learning algorithms. In the proposed system, the artificial intelligence algorithm can be implemented in the single-board computer or in the first electronic device. In other embodiments, the system further comprises a remote computing device located in the cloud and operatively connected to the first electronic device, to the second electronic device, and to the single-board computer. In this last case, the artificial intelligence algorithm can be implemented in the remote computing device.

In one embodiment, the system further comprises a recognition mechanism carried by the presenter, for example, a band of at least one color, a logo, or a QR code.

In one embodiment, the presenter tracking means comprise an infrared light terminal carried by the presenter and an infrared detection camera connected to the single-board computer.

In one embodiment, the presenter tracking means comprise an optical flow tracking algorithm implemented in the single-board computer or in the first electronic device.

In one embodiment, the compact module further comprises an additional fixed camera connected to the router and to the power supply.

In one embodiment, the microphone is carried by the presenter. The microphone captures the audio of the presenter and converts it into an electrical signal which can be received either by the single-board computer or by the first electronic device. The signal may include any format, for example, MP3, Windows Media Audio, RIFF, FLV, or any other format.

Likewise, in one embodiment, the system can further comprise one or more audio receivers arranged in the first electronic device and/or in the single-board computer and configured for capturing other audio sources of interest in the room/classroom where the presentation is being given.

In one embodiment, the compact module further comprises a video capturing element configured for receiving external video signals with respect to the compact module, the first electronic device, and the second electronic device.

In one embodiment, the system can also comprise a speech recognition element configured for translating the auditory information captured by the microphone into written text. Said speech recognition element can be implemented/included in the single-board computer or in the first electronic device. In this case, the single-board computer or the first electronic device is configured for transmitting said text to the second electronic device through the local communication network.

In a second aspect, the present invention also provides a (compact) device to improve visual and/or auditory tracking of a presentation given by a presenter. The device comprises at least one fixed camera configured for acquiring information of the presentation shown through an information display support (for example, a blackboard, among others); a moving camera configured for continuously acquiring information of the presenter's position; presenter tracking means configured for obtaining presenter tracking information at least based on the information of the presenter's position acquired by the moving camera; a router configured for providing a local communication network at the place of the presentation; a single-board computer; and a power supply. The single-board computer, the fixed camera, and the moving camera are operatively connected to the router, and the single-board computer is configured for receiving information of the presenter, coming from a first electronic device, the auditory information of the presentation, the information shown through the information display support, and the presenter tracking information; and transmitting the received information to at least a second electronic device of the user.

In one embodiment, the presenter tracking means comprise an artificial intelligence algorithm implemented in the single-board computer.

In a third aspect, the present invention provides a method to improve visual and/or auditory tracking of a presentation given by a presenter which comprises: providing a compact module comprising: a fixed camera, a moving camera, a single-board computer, a router, and a power supply, the single-board computer, the fixed camera, and the moving camera being connected to the router; the router providing a local communication network between a first electronic device of the presenter and at least a second electronic device of the user; obtaining information run in the first electronic device using a first piece of software implemented in the first electronic device; obtaining auditory information of the presentation by means of a microphone; obtaining information of the presentation shown through an information display support using the fixed camera; continuously acquiring information of the presenter's position using the moving camera; the tracking means obtaining presenter tracking information at least based on the acquired information of the presenter's position; and a second piece of software implemented in the second electronic device showing: the information run in the first electronic device, the auditory information of the presentation, the information shown through the information display support, and the presenter tracking information.

In one embodiment, the presenter tracking means comprise an artificial intelligence algorithm.

In one embodiment, the artificial intelligence algorithm can be implemented in the single-board computer, in the first electronic device, or in a remote computing device located in the cloud.

In one embodiment, the method furthermore includes obtaining the presenter tracking information based on the information of at least one color marking, logo, texture, or a QR code carried by the presenter.

In one embodiment, the second piece of software receives all the information to be shown either from the single-board computer or from the first electronic device through the local communication network. For example, communication through the local communication network can be performed by means of a UDP/multicast communication protocol, among others.

In one embodiment, the information run in the first electronic device, the auditory information of the presentation, the information shown through the information display support, and the presenter tracking information are furthermore sent over the Internet to one or more electronic devices of users who do not attend the presentation. For example, they can be sent through a real-time messaging protocol RTMP.

Therefore, the present invention allows the visual and/or auditory tracking of a presentation to be significantly improved. With the proposed solution, the emission of different signals by means of a local network is allowed. Therefore, it is possible to emit the image of the presenter who moves about the room with real time tracking of said presenter, the image on the information display support (if there was one and the presenter has used it to write something thereon), the signal of the presentation emitted by the first computing device (for example, a computer or a laptop, among others) and possibly projected on a screen with a projector, if there was one, and the audio signal of the presenter's speech.

The second electronic devices (for example, computers, laptops, electronic tablets, smart mobile telephones, etc.) which are within the range of the local network simultaneously receive the mentioned signals with a very low latency and provide them to the interested user (listener, student, etc.). The proposed solution therefore allows a user to be able to follow a presentation through his or her electronic device at any point of the room in which the presentation is taking place or even remotely by streaming.

The invention is particularly designed so that people with a low visual capacity (reduced vision) or low hearing capacity (hearing impairment) can have access to all the visual and auditory information of the activity that is taking place in real time. It also makes it easier to follow the class or presentation in large rooms with a large number of listeners, in rooms with poor distribution which makes it difficult to clearly follow the presentation, or in rooms with acoustics that are not suitable for all types of audience.

Any student or listener can access the signals emitted by the system/device by means of the second piece of software, for example, a computer application. The number of users (students) that the system can serve simultaneously is scalable (in a basic configuration).

The device (or compact module) is a small-sized device of reduced weight (about 2 kg) and therefore readily transportable, which entails a significant advantage given the intended use thereof such as in different rooms or places to which the presenter/professor/speaker goes. The device is designed to work in any type of room or conditions, with a quick and simple start-up that only requires connecting it to a mains socket or outlet for putting it into operation, and this facilitates the quick installation thereof in those cases in which it is of interest due to the presence of visually/hearing impaired people, rooms with poor visibility, online recording or transmission, etc.

In some examples, in addition to allowing the capture of all the information run in the first electronic device, the first piece of software or master software installed in the first electronic device of the presenter furthermore allows the emission of the rest of the signals. The second piece of software or player software installed in the second electronic device allows the reception of the signals. A tracking software, which can be installed in the single-board computer or in the cloud, also allows the emission of all the signals, and furthermore the tracking of the presenter.

In some embodiments, the first piece of software can work on different platforms (PC, IOS, and Android), allows the emission in local network and by streaming (provided that wireless Internet connection is available in the class or room) of the three video signals and of the audio signal (i.e., the image of the presenter, the image of the support, and the image of the screen of the electronic device of the presenter, and audio), and allows the recording of complete sessions or the recording of independent videos and audio.

The second piece of software is developed so as to enable being installed in PC, Android, and IOS. This software allows receiving the three video signals and the audio signal, where they can be changed according to demand and viewed in multi-display, in pairs or alone, and with a quick transition from one to another and a local latency of less than 0.5 seconds. It also allows zooming in on any of the images and changing the contrast (white on black, black on white, etc.). It also allows stopping and resuming any video signal, taking a screenshot, and storing it in an archive, and playing back the videos and audios recorded with the software of the electronic device of the presenter, in a complete session as if one were in class.

Therefore, the proposed system/device is simple and practical and has a reduced cost, and a very efficient operation is achieved with these features without the compact module heating up, allowing a large number of users to connect to the system/device with smooth communication and without interruptions and covering the entire extent of the presentation area with high image quality.

BRIEF DESCRIPTION OF THE DRAWINGS

The foregoing and other features and advantages will be better understood from the following merely illustrative and non-limiting detailed description of embodiments in reference to the attached drawings, in which.

DETAILED DESCRIPTION OF THE INVENTION AND OF EMBODIMENTS

The present invention proposes a method, device, and system for improving third parties following the content (visual, audio, text, etc.) of a presentation, being particularly useful for the visually or hearing impaired who are allowed to access all the knowledge and information imparted in the presentation in the same conditions as those who do not have any impairment.

Figure 1:
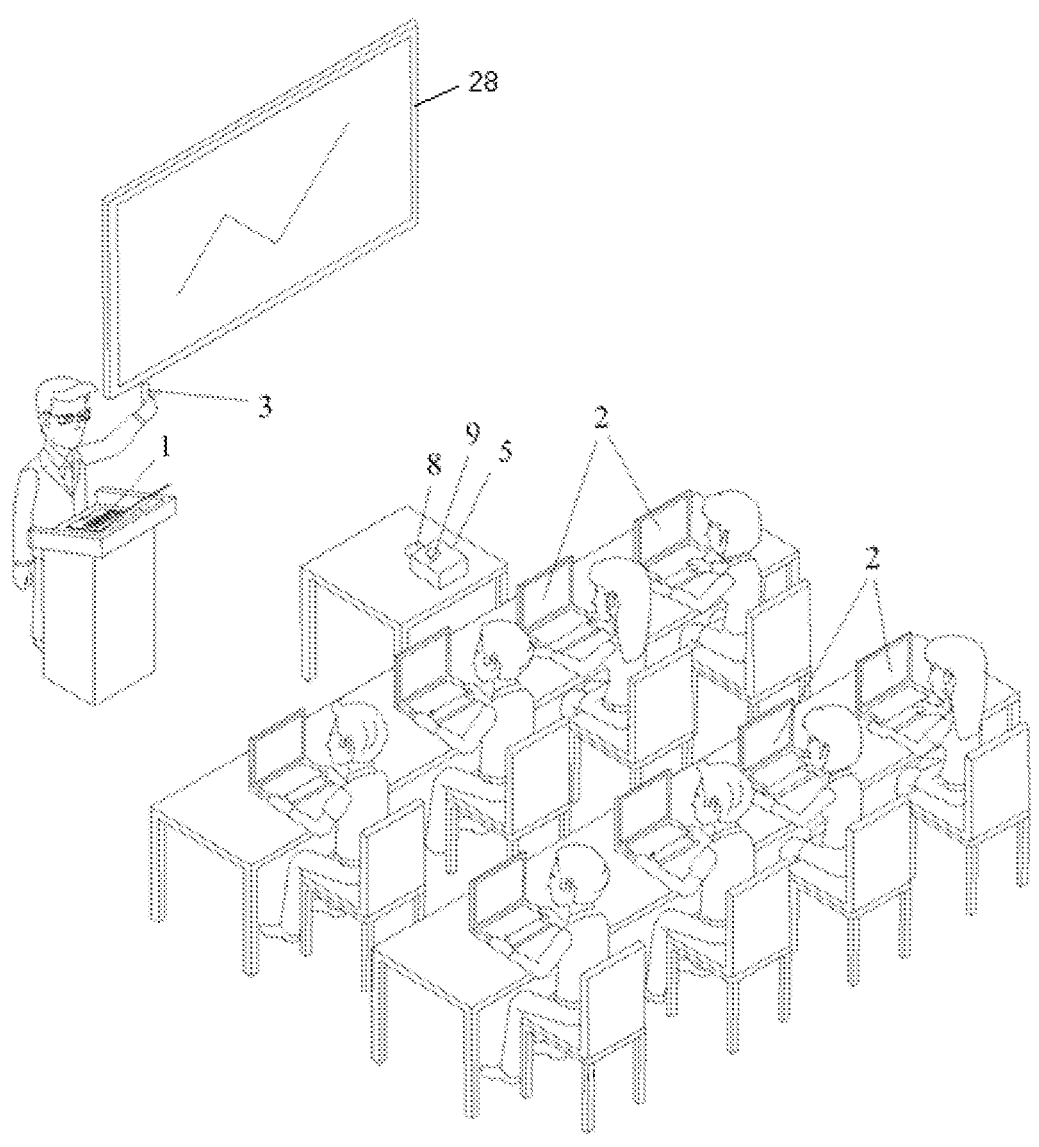
FIG. 1 shows the proposed system to improve visual and/or auditory tracking of a presentation given by a presenter, according to one embodiment.

In reference to FIG. 1, an embodiment of the proposed system is shown therein. The system allows capturing visual and auditory information of the presentation and transmitting the captured information to the electronic receiving devices 2 by means of a wireless local network in real time, i.e., with a very low latency (less than 0.5 second) to favor following the presentation live. To that end, according to this embodiment, the system includes an electronic device 1 of the presenter; electronic devices 2 of the users or attendees of the presentation; a microphone 3 (i.e., any device capable of converting sound into an electrical, analog, or digital signal); and a compact module 5.

In this embodiment, the compact module 5 (or device) incorporates a fixed camera 8, a moving camera 9, a single-board computer 10 (see FIG. 2), a router 6, and a power supply, particularly a 12 V power supply. The cameras 8, 9 can be of several types, such as digital/electronic or video cameras, 2D cameras, 3D cameras, etc., and can capture video in analog or digital format. The field of view of the fixed camera 8 is focused on the information display support 28 (hereinafter simply support) and serves for acquiring information of the presentation shown through said support 28. The moving camera 9 is configured for continuously acquiring information of the presenter's position (i.e., the field of view of the moving camera 9 can be oriented (or the field of view thereof can be oriented, for example, using means 21 for directing the compact module 5, see FIGS. 3A-3C) so that it is focused on the presenter at all times). The router 6 provides a local communication network between the electronic device 1 of the presenter and the electronic devices 2 of the users.

As can be seen in FIG. 1, the compact module 5 is placed in the room/classroom where the presentation will be given in a position which allows the camera system of the module to be focused on the support 28, the projection area, and the presenter, and at a distance from the electronic device 1 of the presenter, typically a PC or laptop, but also a tablet, mobile telephone, or any electronic device, in which the presenter can present information, allowing a connection to be established therewith by means of the mentioned local network. Since the position in which it is placed is fixed, the compact module 5 only has to be connected to the mains to start its operation.

Likewise, the system includes presenter tracking means configured for obtaining presenter tracking information at least based on the information of the presenter's position acquired by the moving camera 9. In one embodiment, the presenter tracking means comprise one or more artificial intelligence algorithms. In some embodiments, the algorithm/algorithms can be trained to detect a texture of the segmented image of the presenter. In other examples, the tracking means comprise a hybrid system formed by one or more artificial intelligence algorithms and recognition mechanism/element such as a band or color marking, a logo, or a QR code. With the implementation of any of these tracking means, tracking failures due, for example, to the presenter having his or her back against the camera or to poor lighting conditions, are prevented.

In other embodiments, the presenter tracking means comprise an infrared camera 7 connected to the single-board computer 10 and an infrared light terminal carried by the presenter.

Continuing with the explanation of FIG. 1, both the electronic device 1 of the presenter and the electronic devices 2 of the users include respective pieces of software (or communications management means) for: obtaining information run in the electronic device 1, in the case of the software implemented in said electronic device 1 (or first piece of software), and for receiving and showing, in the case of the software implemented in the electronic devices 2 (or second piece of software): the information run in the electronic device 1 of the presenter, the auditory information of the presentation obtained with the microphone 3, the information shown through the support 28, and the presenter tracking information. Likewise, the single-board computer 10 includes software for controlling the reception of signals/information from the cameras (fixed, moving, and optionally external cameras 14), from the electronic device 1 of the presenter, from the microphone 3, and from the tracking means, and for controlling the transmission of signals/information to the electronic devices 2 of the user.

Therefore, the signals that the system can record and transmit are: 1) a real-time image of the first shot of the presenter, with continuous tracking thereof (so as to be able to hear him or her and perceive his or her body language); 2) the image of the support 28 used by the presenter (so as to be able to see what he or she writes or draws on the support); 3) the image of the presentation, videos, or problems projected in said presentation in the electronic device 1 of the presenter; and, 4) the sound signal of the professor's narration in real time. In some embodiments, the system even allows 5) obtaining a video image of other cameras by means of a video capturing element implemented in the compact module 5.

The second piece of software implemented in the electronic devices 2 of the user ensures, particularly by means of the UDP/multicast communication protocol (which is non-limiting because other protocols could also be used), communication with the corresponding device thereof, such that this favors an improved connectivity between a much larger number of users.

In addition to through the local network mentioned above, the signals can also be sent online (using any known Internet protocol, for example, a real-time messaging protocol, RTMP) to other users who are not in the place of the event.

Particularly, the transmission of video signals over the local communication network has an H.264 video compression format with the elimination of some filters with a rather insignificant loss of information, so as to maintain the quality of the final video but reducing the compression size to increase transmission speed. Other compression video formats could also be used.

Therefore, the compact module 5 can work in a local network without requiring an Internet connection. In the case in which the compact module 5 must transmit the signal to users who are not in the room over the Internet, the compact module 5 can include a communication device or module, for example, a 4G or 5G card. The compact module 5 can therefore provide the system with Internet service, if the room does not have a connection or if the connection is very weak.

In some embodiments, the compact module 5 can also include an additional fixed camera 8.1 (see FIG. 2) connected to the router 6 and to the power supply 13. This additional fixed camera 8.1 is complementary to the fixed focusing camera 8 and arranged such that, between both of them, they cover all the points of interest of the presentation. The existence of this additional fixed camera 8.1 allows maintaining high image quality and clarity in the entire extent of the support 28. This additional fixed camera 8.1 thereby allows focusing on the entire presentation space which includes the support 28 or a projection area, and it can also be reoriented to focus on any other point of interest in the room, such as a board with additional information or even a sign language interpreter allowing those with an extremely high degree of hearing loss to follow the explanations.

The existence of both cameras 8, 8.1 represents a significant advantage with respect to systems existing today which only have one camera which is not capable of covering the entire extent of the presentation space, for example, the blackboard. It has been demonstrated in practice that wide-angle cameras, contrary to what was initially thought, are not capable of covering large spaces since they greatly enlarge the field of view as a result of the mode in which they gather the image, which causes the resolution in each small area to decrease considerably. In this manner, when zooming in to enlarge any word or sentence written on the support 28, it could not be seen clearly, unless large, high-resolution, cost-prohibitive, professional wide-angle cameras that are unviable for the proposed solution are used. With the use of the additional fixed camera 8.1, particularly of the same type as the fixed camera 8, the field of view for wide supports 28 or display areas can be enlarged, without the image being deformed and without the clarity thereof reduced.

Likewise, in some embodiments, the compact module 5 can include a speech recognition device connected to the first piece of software and to the single-board computer 10. With this speech recognition device, the device 5 will be capable of transcribing, in real time, the presenter's speech by means of subtitles in the chosen language. In this case, an application with a reliable audio transcription engine for transcribing audio in real time must be included. The option for recognizing the OCR text of the image of the presentation can also be activated and the audio signal of the speech can be connected with the actual hearing aid of a user with hearing loss. It must be indicated that, in other embodiments, the speech recognition element/device can be included in the electronic device 1 of the presenter.

In one embodiment, once powered with electric current, the compact module 5 works autonomously, i.e., without all the information having to go through a control and production center, receiving the following signals or information: the image of the presenter and optionally of his or her surroundings, the fixed image of the support, the signal coming from the electronic device 1 of the presenter, the audio signal, and optionally the external video signal obtained with a video capturing element 14. The signal/information coming from the electronic device 1 of the presenter can be received (and transmitted to the electronic devices 2 of the user) at all times or only when the presenter activates said functionality (sharing/duplicating his or her computer screen). For example, the software can ask the presenter (through the user interface of his or her electronic device) whether he or she wants to share his or her screen, and if the answer is affirmative, the signal with the content of the screen of the electronic device 1 of the presenter will be sent to the single-board computer 10. The same may occur with the rest of the signals, i.e., the fixed signal of the support 28, the image of the presenter, and the audio signal can be received by the compact module 5 and transmitted to the electronic devices 2 of the user at all times or only when the corresponding functionality is activated. Therefore, if any of the signals is to be blocked for image protection, or cost reduction, or equipment consumption reduction, the compact module 5 can work by emitting only one or more of the signals (for example, with the suitable configuration, it could only emit the presenter's computer screen and the audio signal). To that end, the system administrator (or the presenter him or herself) can interact with the compact module 5 (through a suitable interface) to block (not transmit) any of the signals.

In another embodiment, the first piece of software run in the electronic device 1 of the presenter is developed to receive the mentioned signals/information. In this case, the first piece of software is in charge of sending all these signals to the router 6 and from the router to the electronic devices 2 of the users. This communication can be transmitted to the electronic devices 2 of the user at all times or only when the presenter activates the functionality of sharing/duplicating the screen of his or her electronic device 1.

In yet another embodiment, the mentioned signals/information can be received by means of a remote computing device located in the cloud (not illustrated) and operatively connected with the electronic devices 1, 2 and with the single-board computer 10.

Figure 2:
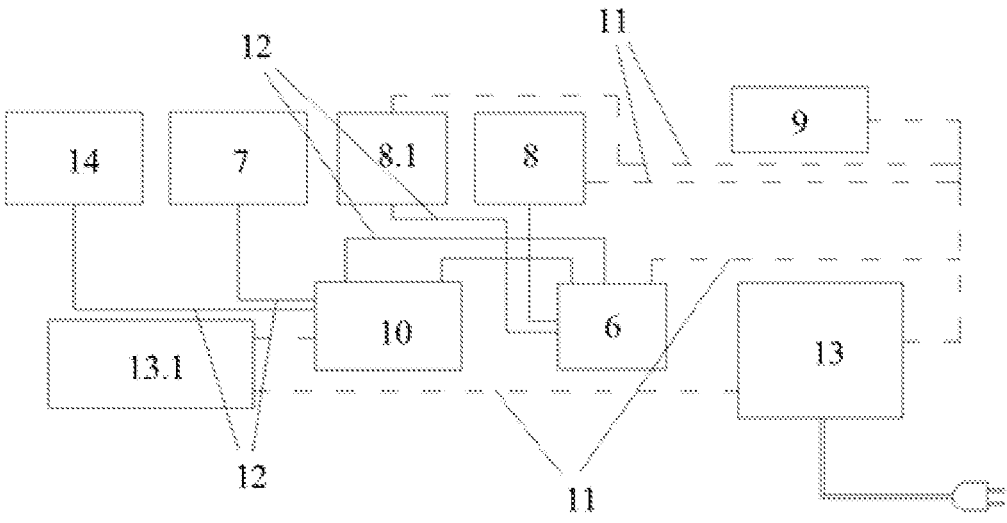
FIG. 2 is a schematic view of the connections between the elements of the device, or a compact module, to improve visual and/or auditory tracking of a presentation given by a presenter, according to one embodiment.

FIG. 2 shows an embodiment of the connections between the different elements which can be comprised in the compact module 5. According to this example, the moving camera 9, the fixed cameras 8, 8.1, and the router 6 are powered by means of the power supply 13, while there is a second power supply 13.1, particularly a 5 V power supply, for powering the single-board computer 10. In this particular embodiment, the compact module 5 also includes an infrared camera 7 directly powered by said single-board computer 10, preferably a Jetson Nano or a Raspberry pi, among others, through a USB port. The power supply connections 11 have been depicted by means of dashed lines. The data connections between the fixed cameras 8, 8.1, the moving camera 9, and the router 6 are through two Ethernet cables 12 and have been depicted by means of solid lines. There are two data connections between the single-board computer 10 and the router 6. The first data connection is to provide Internet service to the router 6 (first function of the single-board computer 10). The Ethernet port of the router 6 must be the Internet input port. The second data connection is to allow communication between the moving camera 9 and the single-board computer 10 and allow tracking (second function of the single-board computer 10). This cable comes out of the single-board computer 10 with a USB outlet and enters the router 6 with an Ethernet outlet (so a coupling which allows switching is needed). This is done because the single-board computer 10 does not have two Ethernet input jacks.

It must be indicated that, although the moving camera 9 is preferably included in the compact module 5, in some embodiments this moving camera can be separated from the compact module 5 and communicated therewith by means of a cable or wirelessly. Likewise, the invention can include more than one moving camera 9.

If the infrared camera 7 is incorporated, it is communicated with the single-board computer 10 through a USB cable.

In some examples, the presenter tracking means can also comprise an optical flow tracking algorithm implemented in the single-board computer 10 or in the electronic device 1. In a particular example, the optical flow tracking algorithm is run/implemented when a failure or interruption occurs in the at least one infrared detection camera 7. Infrared tracking is thereby performed by means of the infrared camera 7 placed in the compact module 5 and the infrared light terminal carried by the presenter which emits an infrared light that must be detected by the infrared camera 7, so the presenter's position is known and his or her image can be taken with the moving camera 9. In this embodiment, the microphone 3 is also carried by the presenter and is included in the same mobile infrared light terminal to capture and transmit the audio signal of the presenter's speech.

Therefore, in this embodiment of the invention, infrared tracking is used primarily. If for any reason, such as the presenter turning his or her back when writing on the support 28 or interference from other infrared light sources in the room, and the existence of a conflict with or loss of the infrared light signal, tracking by means of optical flow is automatically set in motion. The optical flow tracking algorithm can be run automatically and controlled by the single-board computer 10 or manually by the presenter. In this sense, the presenter can, for example, select in the first piece of software for tracking to be performed by means of optical flow detection instead of infrared, and the software communicates with the single-board computer 10 and sends to said single-board computer the order which it executes. In tracking by means of the mentioned optical flow algorithm, a protocol which identifies movement in the images by comparing one frame and the subsequent frame within the video sequence is used. The speed of movement of the camera is fixed based on the variations of the presenter's position which are detected in the sequential images of the video.

It must be indicated that the inclusion of the infrared camera 7 and the optical flow tracking algorithm is completely optional in the present invention. For example, in the embodiments in which the presenter tracking means are implemented by means of the mentioned algorithm/the mentioned artificial intelligence algorithms or by means of the hybrid system, these elements are not necessary.

In a particular embodiment, the algorithm/algorithms is/are based on OpenCV computer vision library, with a pre-trained multiple object detection model suitable for detecting people (for example, the Google™ model, although any other known model can also be used). Furthermore, an additional processing can be added to train on the first person passing through the target position. In one embodiment, detection can be performed by using the comparison of HSV ("Hue, Saturation, Value") histograms and shape formats of each detected person, or by a segmentation method. Once the person to be tracked (the presenter) is identified, the variations of the position of this person in the sequential images sent by the moving camera 9 which captures the image of the presenter are determined and sent through commands (indicating where the presenter is) by means of a TCP connection to the IP address and the port of the moving camera 9 (which will have, for example, a port for sending hexadecimal control commands in VISCA protocol). The speed of movement of the camera 9 is fixed based on the variations of the presenter's position which are detected in the sequential images of the video. It must be indicated that the foregoing is just one possible example, and other computer vision mechanisms which allow tracking people can be used.

With respect to tracking by means of QR code recognition, a QR code carried by the presenter (for example, on a tag, sticker, portable device, or any other mode) will be used as a marking so that the position and the distance of the presenter can be identified at all times by detecting said marking. To that end, in one embodiment, the OpenCV computer vision library, specifically QR type plate detector, will again be used. With a surface having markings of a known size, the moving camera 9 is calibrated, obtaining the intrinsic parameters thereof as focal distances and a distortion matrix. With this information and a marking having a known dimension, said marking can be detected and identified through the detection of characteristic points. Therefore, if the presenter has the selected marking (which can be a QR code), the position and distance of the person carrying the marking (in this case, the QR code) can be identified at all times.

With respect to tracking by means of color marking recognition, a color marking carried by the presenter (for example, on a tag, sticker, portable device, or any other mode) will be used as a marking so that the position and the distance of the presenter can be identified at all times by detecting said marking. This protocol will filter said color in the image captured by the moving camera 9, using this detection to identify the position of the person to be tracked.

It must be indicated that the foregoing are just possible examples and other mechanisms which allow tracking people by means of marking can be used.

The combination of these types of tracking (by means of artificial intelligence, QR code recognition, and/or color marking) allows the disappearance of failures (interruptions) during tracking (due, for example, to the presenter having his or her back against the camera or to poor lighting conditions in the room). This correct tracking of the presenter is substantial because receiving a correct image of the presenter at all times allows the receiver to perceive the presenter's body language (which is very important in communication).

Furthermore, this tracking allows viewing, with a higher resolution compared with the fixed camera 9 (which focuses on the entire support 28), what the presenter is writing at any given moment on the support 28 since the moving camera 9 which follows the presenter focuses precisely on the part of the support 28 close to the presenter. This therefore allows obtaining not only a general shot of the support 28 (fixed camera 8, 8.1), but also a reduced shot (moving camera 9) of what the presenter is writing at any given moment with much higher quality so as to allow zooming in better (for example, for those people with serious vision problems).

Figure 3A:
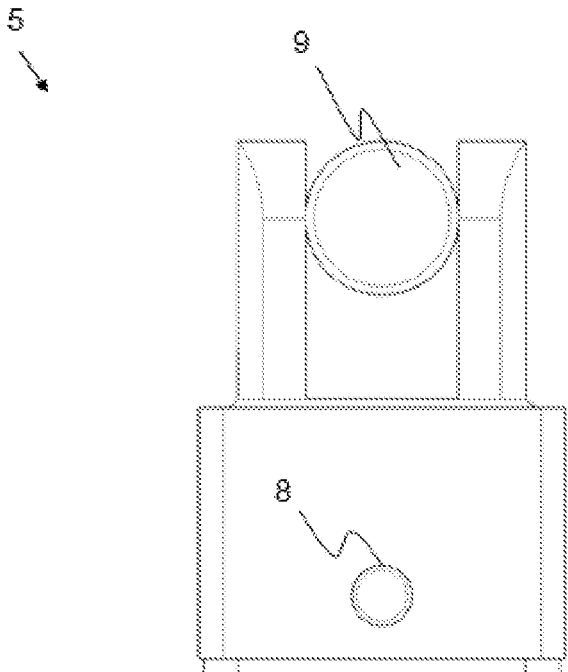
FIGS. 3A-3C show different views of the device, or a compact module, used by the present invention, according to one embodiment.
Figure 3B:
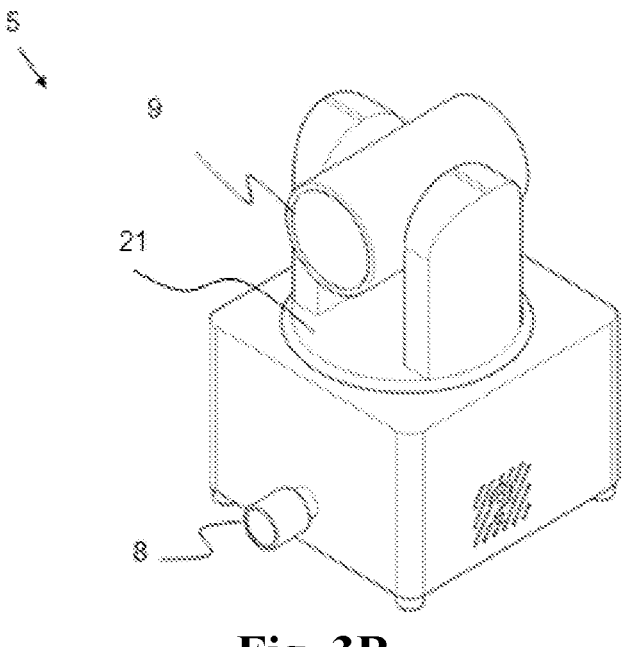
Figure 3C:
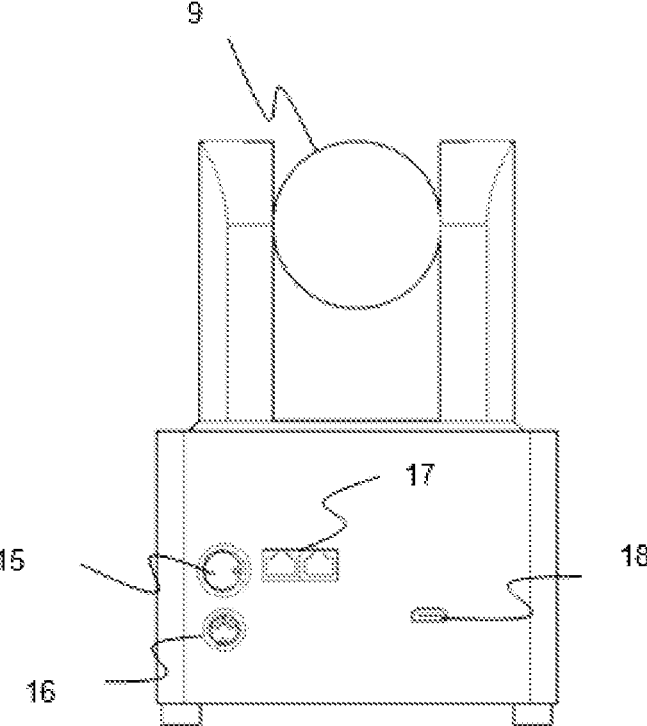

FIGS. 3A-3C show a particular embodiment of the compact module 5 with the fixed camera 8 and the moving camera 9. The ON/OFF button 15 of the compact module 5, a connector 16 for powering/charging the module, RJ45 connectors 17, and an HDMI connector 18 can also be seen in the rear view of FIG. 3C. In some embodiments, the compact module 5 can be controlled using a remote control.

Although the present invention has been described in reference to specific embodiments, those skilled in the art must understand that the foregoing and other various changes, omissions, and additions in the form and detail thereof can be made without departing from the spirit and the scope of the invention as defined by means of the following claims.

The invention claimed is:
1. A system to improve visual and/or auditory tracking of a presentation given by a presenter, comprising:
a first electronic device of the presenter, integrating a first piece of software configured to obtain at least information run in the first electronic device;
at least a second electronic device of a user, integrating a second piece of software;
a microphone adapted to obtain auditory information of the presentation;
a compact module, which is a portable device, comprising:

a fixed camera configured to acquire information of the presentation shown through an information display support;
a moving camera configured to continuously acquire information of the presenter's position;
a single-board computer;
a router configured to provide a local communication network between the first electronic device and the second electronic device; and
a power supply,
the single-board computer, the fixed camera, and the moving camera being operatively connected to the router;
a presenter tracking element configured to obtain presenter tracking information at least based on the information of the presenter's position acquired by the moving camera;
a speech recognition element, included in the compact module or in the first electronic device, and configured to translate the auditory information captured by the microphone into written text,
the single-board computer or the first electronic device being further configured to transmit said written text to the second electronic device through the local communication network;
wherein the second piece of software is adapted to show through the second electronic device: the information run in the first electronic device, the auditory information of the presentation including the written text, the information shown through the information display support, and the presenter tracking information.
2. The system according to claim 1, wherein the presenter tracking element comprise an artificial intelligence algorithm.
3. The system according to claim 2, further comprising a recognition mechanism carried by the presenter, wherein the recognition mechanism comprises a band of at least one color, a logo, or a QR code.
4. The system according to claim 2, wherein the artificial intelligence algorithm is implemented in the single-board computer or in the first electronic device.
5. The system according to claim 2, wherein the system further comprises a remote computing device located in the cloud and operatively connected with the first electronic device, the second electronic device, and the single-board computer, wherein the artificial intelligence algorithm is implemented in the remote computing device.
6. The system according to claim 1, wherein the presenter tracking element comprise an infrared light terminal carried by the presenter and an infrared detection camera connected to the single-board computer.
7. The system according to claim 1, wherein the presenter tracking element comprise an optical flow tracking algorithm implemented in the single-board computer or in the first electronic device.
8. The system according to claim 1, wherein the compact module further comprises an additional fixed camera connected to the router and to the power supply.
9. The system according to claim 1, wherein the microphone is carried by the presenter.
10. The system according to claim 9, further comprising one or more audio receivers arranged in the first electronic device or in the single-board computer, configured to capture other audio sources of interest in a room where the presentation is being given.
11. The system according to claim 1, wherein the compact module further comprises a video capturing element configured to receive external video signals with respect to the compact module, the first electronic device, and the second electronic device.

12. A portable device to improve visual and/or auditory tracking of a presentation given by a presenter, said device comprising:

at least one fixed camera configured to acquire information of the presentation shown through an information display support;

a moving camera configured to continuously acquire information of the presenter's position;

a presenter tracking element configured to obtain presenter tracking information at least based on the information of the presenter's position acquired by the moving camera;

a router configured to provide a local communication network on a site of the presentation;

a single-board computer;

a speech recognition element configured to translate auditory information of the presentation into written text; and a power supply, the single-board computer, the fixed camera, and the moving camera are operatively connected to the router; and the single-board computer is configured to:

receive information of the presenter, coming from a first electronic device, the auditory information of the presentation including the written text, the information shown through the information display support, and the presenter tracking information; and transmit the received information to at least a second electronic device of a user.

13. The device according to claim 12, wherein the presenter tracking element comprise an artificial intelligence algorithm implemented in the single-board computer.

14. A method to improve visual and/or auditory tracking of a presentation given by a presenter comprises:

providing a compact module, which is a portable device, comprising: a fixed camera, a moving camera, a single-board computer, a router, and a power supply, the single-board computer, the fixed camera, and the moving camera being connected to the router;

the router providing a local communication network between a first electronic device of the presenter and at least a second electronic device of the user;

obtaining information run in the first electronic device using a first piece of software implemented in the first electronic device;

obtaining auditory information of the presentation using a microphone;

translating said auditory information of the presentation into written text using a speech recognition element;

obtaining information of the presentation shown through an information display support using the fixed camera;

continuously acquiring information of the presenter's position using the moving camera;

a presenter tracking element obtaining presenter tracking information at least based on the acquired information of the presenter's position; and a second piece of software implemented in the second electronic device showing: the information run in the first electronic device, the auditory information of the presentation including the written text, the information shown through the information display support, and the presenter tracking information.

15. The method according to claim 14, wherein the presenter tracking element comprise an artificial intelligence algorithm.

16. The method according to claim 15, wherein the artificial intelligence algorithm is implemented in the single-board computer, in the first electronic device, or in a remote computing device located in the cloud.

17. The method according to claim 16, which further comprises obtaining the presenter tracking information based on the information of at least one color marking, logo, texture, or a QR code carried by the presenter.

18. The method according to claim 14, wherein the second piece of software receives all the information to be shown either from the single-board computer or from the first electronic device through the local communication network.

19. The method according to claim 14, wherein the information run in the first electronic device, the auditory information of the presentation, the information shown through the information display support, and the presenter tracking information are further sent over the Internet to one or more electronic devices of users who do not attend the presentation.

* * * * *